United States Patent [19]
Dowdall et al.

[11] 3,815,634
[45] June 11, 1974

[54] FLUID CONTROL VALVES

[75] Inventors: Dennis Stephen Dowdall, Morden; Peter Ernst Dieter Price, Farnborough, both of England

[73] Assignee: Telektron Limited

[22] Filed: June 28, 1971

[21] Appl. No.: 157,314

[30] Foreign Application Priority Data
June 30, 1970  Great Britain............ 31699/70
Dec. 15, 1970  Great Britain............ 59432/70

[52] U.S. Cl. .................................. 137/627.5
[51] Int. Cl. .................................. F16k 11/14
[58] Field of Search ...................... 137/627.5

[56] References Cited
UNITED STATES PATENTS
2,985,146   5/1961   Randol............... 137/627.5
2,991,801   7/1961   Larsson............. 137/627.5 X
3,109,456   11/1963  Horowitz et al..... 137/627.5
3,646,969   3/1972   Stampfli............ 137/627.5

FOREIGN PATENTS OR APPLICATIONS
897,521   5/1962   Great Britain......... 137/627.5

*Primary Examiner*—Robert G. Nilson
*Attorney, Agent, or Firm*—Brisebois & Kruger

[57] ABSTRACT

A fluid flow control valve in which communication between respective inlet, outlet and exhaust ducts is controlled by movement of an axially reciprocable spool relative to an annular sealing member co-operating with respective seat means on the spool and on the housing of the valve, in which movement of the spool in one direction first effects sealing engagement between the spool seat and the sealing member to close one line of communication, and then moves the member off the other seat means to open another line of communication. The sealing member may, for example, be a flexible diaphragm or a piston.

1 Claim, 11 Drawing Figures

FLUID CONTROL VALVES

This invention relates to fluid flow control valves and comprises broadly a fluid flow control valve in which communication between inlet and outlet ducts is controlled by an annular sealing member, biased into sealing engagement with a stationary annular first seat, and a spool member which is formed with an annular second seat and is axially reciprocable relative to the sealing member, so that movement of the spool member in one direction brings the second seat into sealing engagement with the sealing member and displaces the latter out of engagement with the first seat, return movement of the spool member allowing the sealing member to make sealing engagement with the stationary first seat and disengaging the second seat from the sealing member.

Further features of the invention will sufficiently appear from the following description, given with reference to the accompanying drawings, of particular embodiments of the invention and from the appended claims when read in the light of that description.

Figure 1:
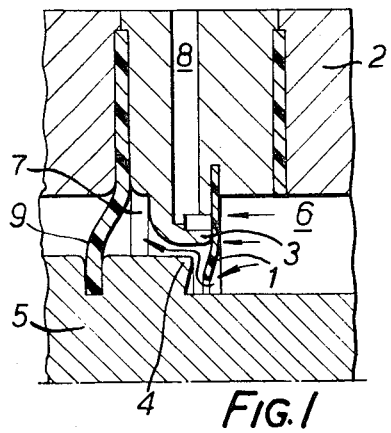
FIGS. 1 to 3 are fragmentary axial sections through one form of valve constructed in accordance with the invention, the three Figures showing the sealing member and co-operating seats in different operational positions.

The valve components illustrated in FIGS. 1 to 6 are all essentially of circular cross-section, only one half section being shown in each case. In each case there is an annular sealing member 1 sealed at its outer periphery in a valve housing 2 and co-operating with a stationary first annular valve seat 3 formed in the body 2, and with a second annular valve seat 4 formed on an axially reciprocable spool 5. The spool is freely suspended and sealed to the body by a pair of pliable, diaphragms only one of which is shown at 9 in FIGS. 1 to 6, the other being located on the opposite side of the sealing member 1. Thus, the interior of the valve is divided up to form a supply chamber 6, on the upstream side of the sealing member, communicating with the inlet duct of the valve; a line chamber 7 on the downstream side of the sealing member, which communicates with the outlet duct of the valve and is bounded in part by that portion of the sealing member which lies between its concentric lines of engagement with the two valve seats 3 and 4; and an exhaust chamber 8, communicating with atmosphere, which is also on the downstream side of the sealing member but outside the outer annular valve seat 3.

In FIG. 1, the spool 5 is in an extreme (left-hand) position in which the sealing member 1 is spaced from the spool valve seat 4, but is engaged with the stationary seat 3, thereby placing the supply chamber 6 and line chamber 7 in communication and isolating the exhaust chamber 8. The supply pressure and air flow tend to hold the sealing member 1 in firm closing engagement with the stationary seat 3.

Figure 2:
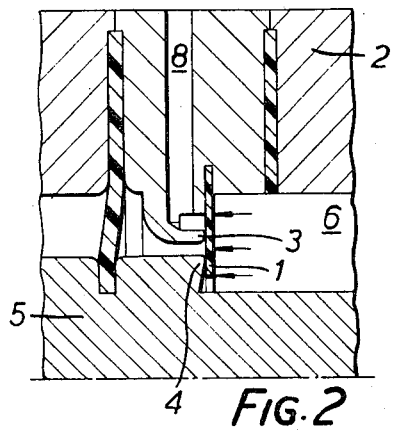
Figure 3:
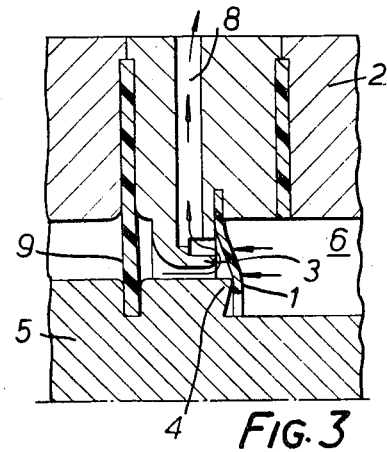

As the spool moves to its opposite extreme (right-hand) position, the spool seat 4 first engages and seals against the sealing member 1 (as shown in FIG. 2) thus isolating the supply chamber, and then moves the member 1 out of sealing engagement with the stationary seat 3, connecting the line chamber to exhaust, as shown in FIG. 3.

Figure 4:
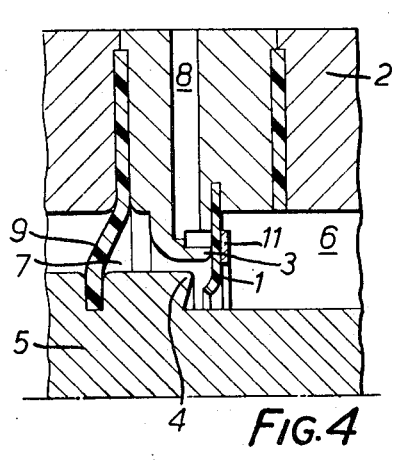
FIGS. 4 to 6 are views corresponding to FIG. 1, showing some possible modifications of the sealing member.
Figure 5:
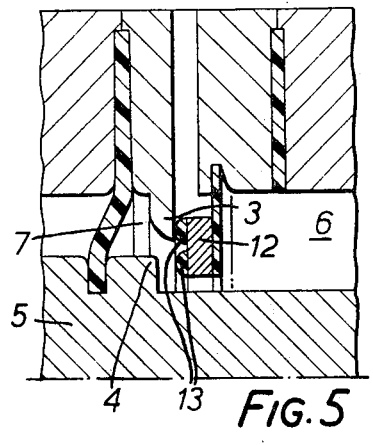

FIGS. 1 to 3 show the sealing member in the form of a simple diaphragm, which is preferably made of pliable but substantially inelastic material, sealed at its outer periphery in the valve housing 2. FIG. 4 shows the diaphragm stiffened by a reinforcing ring 11 secured to its rear face. In FIG. 5, the diaphragm 1 has a reinforcing ring 12 secured to its forward face, and two concentric annular rubber seal elements 13 are bonded to the forward face of the ring for co-operation respectively with the valve seats 3 and 4.

Figure 6:
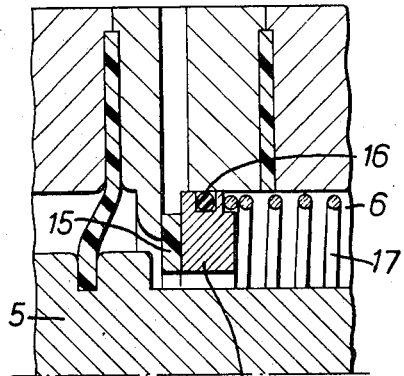

FIG. 6 shows a valve in which the sealing member is constituted by an annular piston 14 having at its forward end a facing 15 of rubber, and sealed to the interior of the valve housing by an O-ring 16. The resilience of the O-ring is sufficient in most cases to accommodate the small range of axial movement of the piston in operation without the O-ring sliding in the housing. This Figure also shows a biasing spring 17 acting on the sealing member, to bias it into sealing engagement with the housing seat 3. Similar biasing springs may also be employed in the arrangements of FIGS. 1 to 5.

Figure 7:
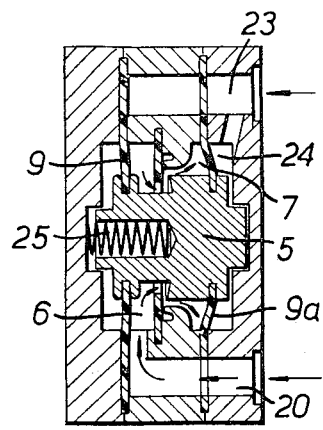
FIGS. 7 and 8 are axial sections, taken in mutually perpendicular planes, through a control valve having parts of the construction shown in FIGS. 1 to 3.
Figure 8:
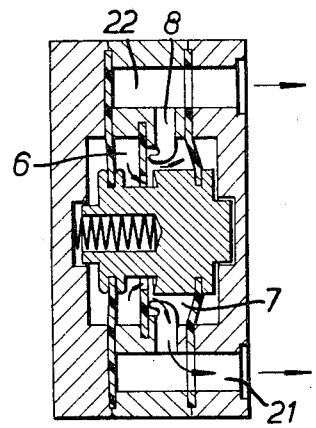

FIGS. 7 and 8 illustrate a three-port, pilot operated normally open directional control valve having an inlet, or supply duct 20 connected to supply chamber 6, an outlet or line duct 21 connected to line chamber 7, an exhaust duct 22 connected to exhaust chamber 8, and a pilot duct 23 connected to a pilot chamber 24. The valving arrangement as between the supply, line and exhaust chambers is as shown in FIG. 1. The valve spool 5 is suspended and sealed by spool diaphragms 9 and 9a and is biased (to the right as drawn) by a coil compression spring 25 tending to hold the valve in the open position shown, in which the supply is connected to the line and the exhaust is isolated. Pilot pressure applied to pilot chamber 24 acts on the spool 5 and adjacent diaphragm 9a to urge the spool to the left, through a position corresponding to FIG. 2 to a position corresponding to FIG. 3, in which the line is isolated from the supply and connected to exhaust. Release of pilot pressure will, of course, permit the spring 25 to return the spool to the position illustrated and re-open the valve.

The same general construction is, of course, applicable to a normally closed valve, the spool being spring biased to closed position and pilot actuated to open position.

Figure 9:
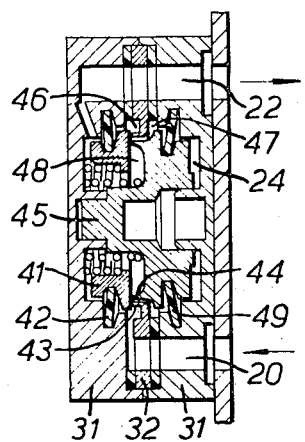
FIGS. 9 and 10 are views, corresponding to FIGS. 7 and 8, of another form of control valve.
Figure 10:
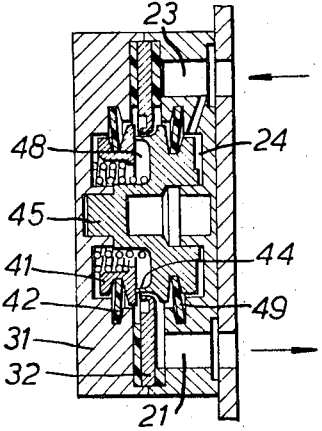

The valve shown in FIGS. 9 and 10 is a three-port, pilot operated, normally closed control valve. The body or housing of the valve is of generally circular cross-section and is built up from a pair of end sections 31 and a central section 32 sandwiched between them and sealed on both faces by sealing gaskets. The body members 31 and 32 are suitably made of aluminium alloy or of a plastics material. The inner periphery of the central section 32 is formed integrally with a stationary valve seat 43 for co-operation with a rigid, annular sealing member 41, freely suspended from and sealed to one body section by a narrow annular diaphragm 42. A valve spool 45 is similarly supported and sealed by another diaphragm 49 from the other body end section, and has an annular seat 44 formed thereon, also for cooperation with the sealing member 41. The sealing member 41 and spool 45 are suitably made of self-lubricating bearing material, such as Nylatron G.S. (trade mark). These two members 41 and 45 are both urged to the right (as viewed in FIG. 9) by respective return springs, and in the normal, or unoperated condition of the valve the sealing member 41 seals against the stationary seat 43 and the spool seat 44 is clear of the sealing member. The interior of the valve is divided, by the above described components, into four internal valve chambers: supply chamber 46 (connected to a supply or inlet duct 20); line chamber 47 (connected to a line or outlet duct 21); exhaust chamber 48 (connected to exhaust duct 22); and pilot chamber 24 connected to a pilot duct 23).

The valve is shown in its pilot operated, "open" condition with the spool in an extreme left hand position, in which the spool seat 44 is closed against the sealing member 41, which is held off the stationary seat 43 thereby connecting the supply chamber 46 to the line chamber 47. On release of the pilot chamber pressure, the return springs urge the sealing member into sealing engagement with the stationary seat (thereby isolating the line chamber from the supply chamber) and the spool member further to the right to connect the line chamber to the exhaust chamber.

Figure 11:
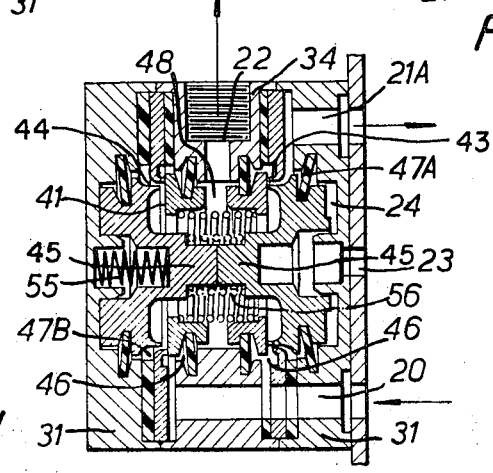
FIG. 11 is an axial section through yet another form of control valve in accordance with the invention.

The valve shown in FIG. 11 is a four-port, pilot operated valve, and is generally similar in construction and operation to the valve of FIGS. 9 and 10. However, in this case there are two oppositely directed sets of sealing members 41, valve spools 45 and stationary seats 43, separated by a special central body portion 34 in which is formed a common exhaust duct 48. A common supply duct 20 is connected to two separate supply chambers 46 and there are two separate line chambers 47A and 47B, communicating respectively with separate line or outlet ducts, of which one is shown at 21A.

The valve may have one or two pilot duct connections according to the mode of operation desired. As shown, there is only a single pilot duct 23 and a spring 55 acts to urge both valve spools to one end position (to the right as shown), and the valve is then a two-position valve, i.e., with the line chambers being connected alternately to the supply and exhaust chambers.

Alternatively, for three position operation, spring 55 is omitted and a spring 56 is provided between the spools 45 to urge them apart, and a second pilot duct connection is provided to allow either spool to be subjected to pilot pressure actuation.

As an alternative to the pilot pressure actuation described above, the valves can be operated in any other convenient way such as electromagnetically or mechanically. For example, the valve spools may be actuated manually by levers or push buttons connected directly to the spools.

It will be readily understood by those skilled in the art that the invention is not limited to diaphragm valves as described herein, but that the spool could be sealed in other ways, as by means of O-rings or U-seals.

We claim:

1. A fluid flow control valve comprising:

an intermediate body section of annular form having a stationary annular valve seat at its inner periphery, said intermediate body section being clamped and sealed between first and second additional body sections;

a first annular inelastic and flexible diaphragm sealingly carried in said first additional body section;

an annular sealing member sealingly supported by said first diaphragm and resiliently biassed into sealing engagement with said valve seat;

a second annular, inelastic and flexible diaphragm sealingly carried in said second additional body section;

a spool member having a second annular valve seat for sealing engagement with said annular sealing member, said spool member being sealingly supported by said second diaphragm and resiliently biassed out of sealing engagement with said sealing member; pilot pressure chamber means defined between and by said second additional body section, said second diaphragm and said spool member, whereby application of pilot pressure to said chamber means effects axial movement of said spool member against the resilient bias acting thereon to cause said second annular valve seat to engage sealingly against said sealing member and then to displace said sealing member from said stationary valve seat;

and means defining inlet and outlet ducts respectively connected to points on either side of said stationary valve seat.

* * * * *